United States Patent
White et al.

(10) Patent No.: US 7,897,830 B2
(45) Date of Patent: Mar. 1, 2011

(54) METHODS FOR REDUCING AMMONIA EVOLUTION FROM CEMENTITIOUS AND POZZOLANIC MIXTURES

(75) Inventors: Charles M. White, Cincinnati, OH (US); Dean A. Oester, Cincinnati, OH (US)

(73) Assignee: Cognis IP Management GmbH, Duesseldorf (DE)

( * ) Notice: Subject to any disclaimer, the term of this patent is extended or adjusted under 35 U.S.C. 154(b) by 344 days.

(21) Appl. No.: 12/111,504

(22) Filed: Apr. 29, 2008

(65) Prior Publication Data

US 2009/0062595 A1 Mar. 5, 2009

Related U.S. Application Data

(60) Provisional application No. 60/968,966, filed on Aug. 30, 2007.

(51) Int. Cl.
*B09B 1/00* (2006.01)
(52) U.S. Cl. ........................................ 588/251; 588/313
(58) Field of Classification Search .................. 588/251, 588/313
See application file for complete search history.

(56) References Cited

U.S. PATENT DOCUMENTS

| 6,046,946 A | 4/2000 | Nadeau-Dostie et al. | 365/201 |
| 6,790,264 B2 * | 9/2004 | Minkara | 106/705 |

FOREIGN PATENT DOCUMENTS

| EP | 0427517 | 5/1991 |
| WO | 0166486 | 9/2001 |
| WO | 2006/029190 | 3/2006 |
| WO | WO2009 027048 | * 3/2009 |

* cited by examiner

*Primary Examiner*—John Kreck

(57) ABSTRACT

A method is provided for reducing the amount of ammonia evolved from a cementitious or pozzolanic mixture containing contaminated fly ash, including: providing fly ash contaminated with ammonia or ammonium-containing compounds; and adding a halogenated hydantoin to the contaminated fly ash, wherein upon the formation of a slurry, the halogenated hydantoin reacts with ammonia to reduce the evolution of ammonia gas from the slurry. Another method includes adding a halogenated succinimide to the contaminated fly ash, adding sodium dichloroisocyanurate to the contaminated fly ash, or adding a halogenated sulfamate to the contaminated fly ash.

4 Claims, No Drawings

METHODS FOR REDUCING AMMONIA EVOLUTION FROM CEMENTITIOUS AND POZZOLANIC MIXTURES

CROSS-REFERENCE TO RELATED APPLICATIONS

This application claims priority under 35 U.S.C. §119(e) to U.S. Provisional Application 60/968,966, filed Aug. 30, 2007, the entire contents of which are hereby incorporated by reference herein.

BACKGROUND OF THE INVENTION

1. Field of the Invention

The invention relates generally to concrete additives, and more particularly, to methods for reducing the evolution of ammonia from fly ash contaminated with ammonia in cementitious and pozzolanic mixtures.

2. Background Information

Fly ash is produced from burning pulverized coal in a coal-fired boiler. It is a finegrained, powdery particulate material that is carried off in the flue gas and may be collected from the gas by electrostatic precipitators or mechanical collection devices, including cyclones. Fly ash is typically disposed in landfill areas.

Fly ash may be used in concrete as a partial replacement for Portland cement, and also as a filler. The presence of fly ash in cement mixtures or concrete has several advantages, including, but not limited to, the reduction of fly ash disposed in landfills, a lower cost than other additives, and a decrease in permeability and shrinkage in the hardened concrete. Other advantages include improved workabililty, durability and long-term strength gain, due to reduced dry shrinkage, reduced heat of hydration, water reduction, reduced alkali silica reactivity, and increased resistance to sulfate attack. Where workability is improved, there is reduced bleeding and segregation, improved flowability, and improved finishing characteristics. In addition, there is the reduction of the greenhouse gas, carbon dioxide, released into the atmosphere by the replacement of a portion of the cement with fly ash.

The use of fly ash in concrete, however, is not without drawbacks. The chemical and physical properties of fly ash are influenced by the coal burned and the handling techniques. The properties are also influenced by the individual combustion techniques and associated efficiency of the individual boilers. Nitrogen compounds, including NO and $NO_2$, referred to generically as NOx, are generated through the combustion of coal. Several technologies have been developed to meet the mandated NOx reduction limits of the Clean Air Act Amendments (1990) of the United States Environmental Protection Agency. The technologies include selective non-catalytic reduction, selective catalytic reduction, and electrostatic precipitation systems. The processes include the injection of ammonia into the flue gas of the power plant to improve performance of the particular process. As a result, some of the ammonia remains unreacted, and is deposited on the fly ash, primarily in the form of ammonium sulfate.

Thus, fly ash that has been treated with ammonia to reduce NOx may be undesirable for use in cementitious or pozzolanic mixtures. For example, when ammonium-containing fly ash is added to an highly alkaline aqueous concrete mixture, the ammonium cations are converted to ammonia gas, which evolves from the cementitious slurry into the air, thus exposing workers to potentially hazardous conditions. The OSHA (Occupational, Safety and Health Administration) threshold and permissible limits are set at 25 ppm for a time-weighted average of eight hours, and 35 ppm for a short term exposure limit of 15 minutes.

A need remains for a method for reducing the evolution of ammonia or other ammonium compounds from contaminated fly ash in cementitious and pozzolanic compositions.

SUMMARY OF THE INVENTION

Briefly described, according to an aspect of the invention, a method for reducing the amount of ammonia evolved from a cementitious or pozzolanic mixture containing contaminated fly ash includes: providing fly ash contaminated with ammonia or ammonium-containing compounds; and adding a halogenated hydantoin to the contaminated fly ash, wherein upon the formation of a slurry, the halogenated hydantoin reacts with ammonia to reduce the evolution of ammonia gas from the slurry.

According to another aspect of the invention, a method for reducing the amount of ammonia evolved from a cementitious or pozzolanic mixture containing contaminated fly ash includes: providing fly ash contaminated with ammonia or ammonium-containing compounds; and adding a halogenated succinimide to the contaminated fly ash, wherein upon the formation of a slurry, the halogenated amine-containing compound reacts with ammonia to reduce the evolution of ammonia gas from the slurry.

According to another aspect of the invention, a method for reducing the amount of ammonia evolved from a cementitious or pozzolanic mixture containing contaminated fly ash includes: providing fly ash contaminated with ammonia or ammonium-containing compounds; and adding sodium dichloroisocyanurate to the contaminated fly ash, wherein upon the formation of a slurry, the halogenated amine-containing compound reacts with ammonia to reduce the evolution of ammonia gas from the slurry.

According to yet another aspect of the invention, a method for reducing the amount of ammonia evolved from a cementitious or pozzolanic mixture containing contaminated fly ash includes: providing fly ash contaminated with ammonia or ammonium-containing compounds; and adding a halogenated sulfamate to the contaminated fly ash, wherein upon the formation of a slurry, the halogenated sulfamate reacts with ammonia to reduce the evolution of ammonia gas from the slurry.

DETAILED DESCRIPTION OF THE INVENTION

According to an aspect of the invention, a method for reducing the amount of ammonia evolved from a cementitious or pozzolanic mixture containing contaminated fly ash includes: providing fly ash contaminated with ammonia or ammonium-containing compounds; and adding a halogenated hydantoin to the contaminated fly ash, wherein upon the formation of a slurry, the halogenated hydantoin reacts with ammonia to reduce the evolution of ammonia gas from the slurry. The hydantoin may be bromochloro dimethylhydantoin, dibromo dimethylhydantoin, or dichloro dimethylhydantoin.

According to another aspect of the invention, a method for reducing the amount of ammonia evolved from a cementitious or pozzolanic mixture containing contaminated fly ash includes: providing fly ash contaminated with ammonia or ammonium-containing compounds; and adding a halogenated succinimide to the contaminated fly ash, wherein upon the formation of a slurry, the halogenated amine-containing compound reacts with ammonia to reduce the evolution of ammonia gas from the slurry. The halogenated suocinimide may be N-bromo succinimide, N-chloro succinimide, or N-iodo succinimide.

According to another aspect of the invention, a method for reducing the amount of ammonia evolved from a cementitious or pozzolanic mixture containing contaminated fly ash includes: providing fly ash contaminated with ammonia or ammonium-containing compounds; and adding sodium dichloroisocyanurate to the contaminated fly ash, wherein upon the formation of a slurry, the halogenated amine-containing compound reacts with ammonia to reduce the evolution of ammonia gas from the slurry.

According to yet another aspect of the invention, a method for reducing the amount of ammonia evolved from a cementitious or pozzolanic mixture containing contaminated fly ash includes: providing fly ash contaminated with ammonia or ammonium-containing compounds; and adding a halogenated sulfamate to the contaminated fly ash, wherein upon the formation of a slurry, the halogenated sulfamate reacts with ammonia to reduce the evolution of ammonia gas from the slurry. The halogenated sulfamate may be N-bromosulfamate, or N-chloro sulfamate.

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "or" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done merely for convenience and to give a general sense of the invention. The description herein should be read to include one or at least one and the singular also includes the plural unless indicated to the contrary.

Advantageously, applicants have found that the treatment of fly ash using the methods according to the invention reduces the evolution of ammonium compounds. In addition, there is no capital or high cost of energy demand required as in other methods of ammonia removal. Moreover, there is a lower corrosivity of bromides versus chlorides to steel, which can be beneficial in steel reinforced concrete applications.

The chemical selected for treatment of fly ash can be mixed in the fly ash prior to using the fly ash in concrete at any point during the processing, storage or handling of fly ash, in any manner conventional in the art to effectively distribute the agent on the surface of the fly ash. The treatment chemical can be of either solid or liquid form. The methods include, but are not limited to mechanical mixers of various designs and other technologies that provide for uniform mixing of liquids on powders, if the chemical is in liquid forms or mixers that provide for uniform mixing of solids.

The chemical can also be added directly during the batching or mixing of concrete at any point in the batching sequence, preferably prior to the introduction of a material containing ammonia or ammonia compounds. A suitable molar ratio of halogen to nitrogen may be 0.25 to 1.5, but the ratio may be higher, depending upon the content of ammonia in the fly ash.

Unless otherwise defined, all technical and scientific terms used herein have the same meaning as commonly understood by one of ordinary skill in the art to which the invention belongs. Although methods and materials similar or equivalent to those described herein can be used in the practice or testing of the invention, suitable methods and materials are described below. In case of conflict, the present specification, including definitions, will control. In addition, the materials, methods and examples are illustrative only and are not intended to be limiting.

EXAMPLES

Example 1

To a sample of fly ash, containing approximately 655 ppm of ammonia compounds (expressed as ammonia), was added various amounts of Treatment Chemicals (listed below). Twenty-five (25) grams of fly ash treated with each Treatment Chemical were each added to a 1000 ml Ehrlenmeyer flask containing 90 ml deionized water with 10 ml of 10% NaOH solution. The flask was stoppered and ammonia gas was allowed to accumulate in the headspace while agitating the mixture for two minutes. The headspace was analyzed for ammonia using a DRAGER® detection tube for ammonia detection according to a method described in U.S. Pat. No. 6,790,264. The ammonia level was reduced, compared to the same test conducted with untreated fly ash, as illustrated in Table 1 below.

TABLE 1

| Treatment Chemical | Mole Ratio Cl or Br:N | $NH_3$ in headspace, ppm |
|---|---|---|
| Control (Untreated fly ash) | 0.0 | 95 |
| Household Bleach (5% NaOCl) | 0:0 | 95 |
|  | 1.0 | 28 |
|  | 1.4 | 11 |
|  | 2.0 | 2 |
| STABREX ® ST-70 (N-bromosulfamate) | 0.0 | 95 |
|  | 1.0 | 38 |
|  | 1.5 | 16 |
|  | 2.0 | 5 |
| Commercial Bleach (12% NaOCl) | 0:0 | 95 |
|  | 1.0 | 23 |
|  | 1.5 | 8 |
|  | 2.0 | 3 |
| BCDMH Bromochlorodimethyl-hydantoin | 0:0 | 95 |
|  | 1.0 | 40 |
|  | 1.6 | 17 |
|  | 2.0 | 7 |
| N-Bromosuccinimide | 0.0 | 95 |
|  | 0.5 | 56 |
|  | 1.0 | 28 |
|  | 1.5 | 2 |
| Sodium dichloroisocyanurate | 0.0 | 95 |
|  | 0.5 | 42 |
|  | 1.0 | 15 |
| Calcium Hypochlorite | 0.0 | 95 |
|  | 1.0 | 61 |
|  | 1.5 | 35 |
|  | 2.0 | 8 |

As illustrated in Table 1, fly ash treated with a compound according to the invention is a significant improvement over treatments with sodium or calcium hypochlorite.

The invention has been described with reference to specific embodiments. One of ordinary skill in the art, however, appreciates that various modifications and changes can be made without departing from the scope of the invention as set forth in the claims.

While the examples used off-grade fly ash, other grades of fly ash may be suitable for treatment according to the invention. In addition, another suitable S compound for treating the fly ash may include N-bromoacetamide. Accordingly, the specification is to be regarded in an illustrative manner, rather than a restrictive view and all such modifications are intended to be included within the scope of the invention.

Benefits, other advantages, and solutions to problems have been described above with regard to specific embodiments. The benefits, advantages, solutions to problems and any element(s) that may cause any benefit, advantage, or solution to occur or become more pronounced are not to be construed as a critical, required, or essential feature or element of any or all of the claims.

What is claimed is:

1. A method for reducing the amount of ammonia evolved from a cementitious or pozzolanic mixture containing contaminated fly ash, comprising:

providing fly ash contaminated with ammonia or ammonium-containing compounds; and adding a halogenated hydantoin to the contaminated fly ash, wherein upon the formation of a slurry, the halogenated hydantoin reacts with ammonia to reduce the evolution of ammonia gas from the slurry.

2. The method according to claim 1, wherein the hydantoin is bromochloro dimethylhydantoin.

3. The method according to claim 1, wherein the hydantoin is dibromo dimethylhydantoin.

4. The method according to claim 1, wherein the hydantoin is dichloro dimethylhydantoin.

\* \* \* \* \*